(12) United States Patent
Han et al.

(10) Patent No.: US 10,070,264 B2
(45) Date of Patent: Sep. 4, 2018

(54) AUTOMATED WLAN RADIO MAP CONSTRUCTION METHOD AND SYSTEM

(71) Applicant: KOREA ADVANCED INSTITUTE OF SCIENCE AND TECHNOLOGY, Daejeon (KR)

(72) Inventors: Dong Soo Han, Daejeon (KR); Suk Hoon Jung, Daejeon (KR)

(73) Assignee: KOREA ADVANCED INSTITUTE OF SCIENCE AND TECHNOLOGY, Daejeon (KR)

(*) Notice: Subject to any disclaimer, the term of this patent is extended or adjusted under 35 U.S.C. 154(b) by 5 days.

(21) Appl. No.: 14/949,169

(22) Filed: Nov. 23, 2015

(65) Prior Publication Data
US 2016/0150380 A1    May 26, 2016

(30) Foreign Application Priority Data

Nov. 25, 2014 (KR) .................. 10-2014-0165022

(51) Int. Cl.
| | |
|---|---|
| *H04W 24/00* | (2009.01) |
| *H04W 4/00* | (2018.01) |
| *H04W 4/04* | (2009.01) |
| *H04W 64/00* | (2009.01) |
| *H04W 84/12* | (2009.01) |

(52) U.S. Cl.
CPC ............ *H04W 4/04* (2013.01); *H04W 64/00* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 2009/0221316 A1* | 9/2009 | Chuang | H04B 17/27 455/522 |
| 2010/0039929 A1* | 2/2010 | Cho | G01S 1/68 370/216 |
| 2012/0072106 A1* | 3/2012 | Han | G01C 21/206 701/410 |

(Continued)

FOREIGN PATENT DOCUMENTS

WO        2014/000090 A1        1/2014

OTHER PUBLICATIONS

Jin Sang et al., "State Analysis of Finite Automata Using Difference of Fuzzy Logic Functions", Korean Institute of Intelligent Systems; Nov. 1994, 163-168 (6 pages).

(Continued)

*Primary Examiner* — San Htun
(74) *Attorney, Agent, or Firm* — Sughrue Mion, PLLC

(57) ABSTRACT

An automated WLAN radio map construction method and system is provided. The automated WLAN radio map construction method includes: collecting WLAN fingerprints obtained by mobile device in an indoor space, machine-learning a learning model which is generated based on a state diagram in which divided areas of an indoor map are expressed by location states, arranging the collected WLAN fingerprints in corresponding location states, and storing a result of the arranging. Accordingly, collection locations of WLAN fingerprints collected in a plurality of unspecific smartphones without reference location information such as GPS signals can be automatically labeled.

17 Claims, 19 Drawing Sheets

(56) References Cited

U.S. PATENT DOCUMENTS

2013/0288704 A1* 10/2013 Wirola .................. H04W 64/00
                                                         455/456.1
2015/0313529 A1* 11/2015 Nevo ..................... A61B 5/165
                                                         600/595

OTHER PUBLICATIONS

Korean Office Action for corresponding Application No. 10-2014-0165022 dated Jan. 26, 2016.

* cited by examiner

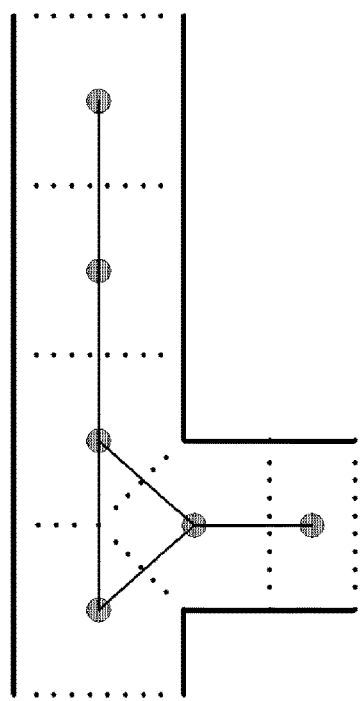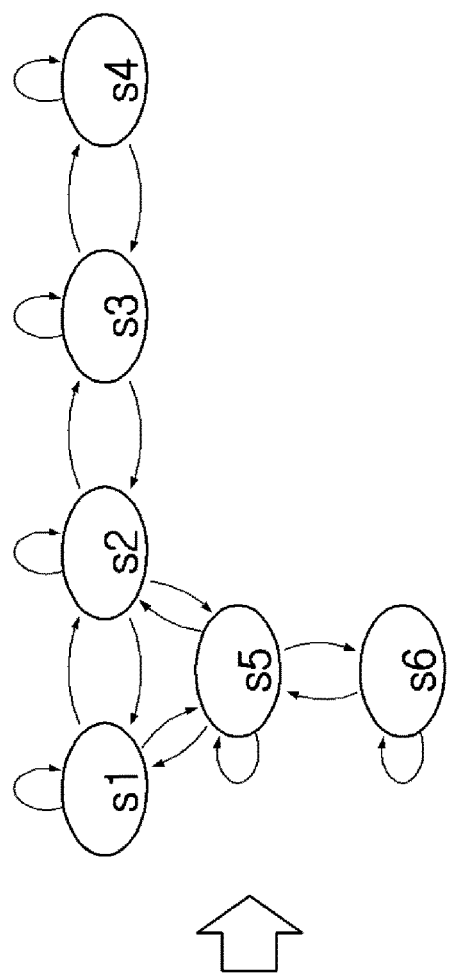
FIG. 4

| $e_{i,LOS}$ | $e_{i,NLOS}$ | $l_{i,1}^{ap}$ | $l_{i,2}^{ap}$ | ... | $l_{i,k}^{ap}$ |
|---|---|---|---|---|---|
| 1.6 | 4.3 | $l_8$ | $l_1$ | ... | $l_3$ |

PM : Propagation Model
$L^{ap}$ : Location of APs

FIG. 6

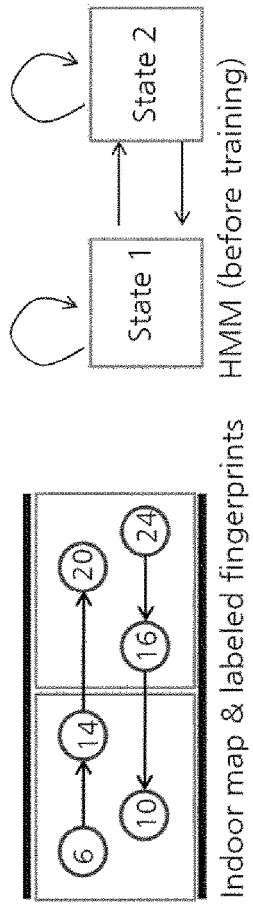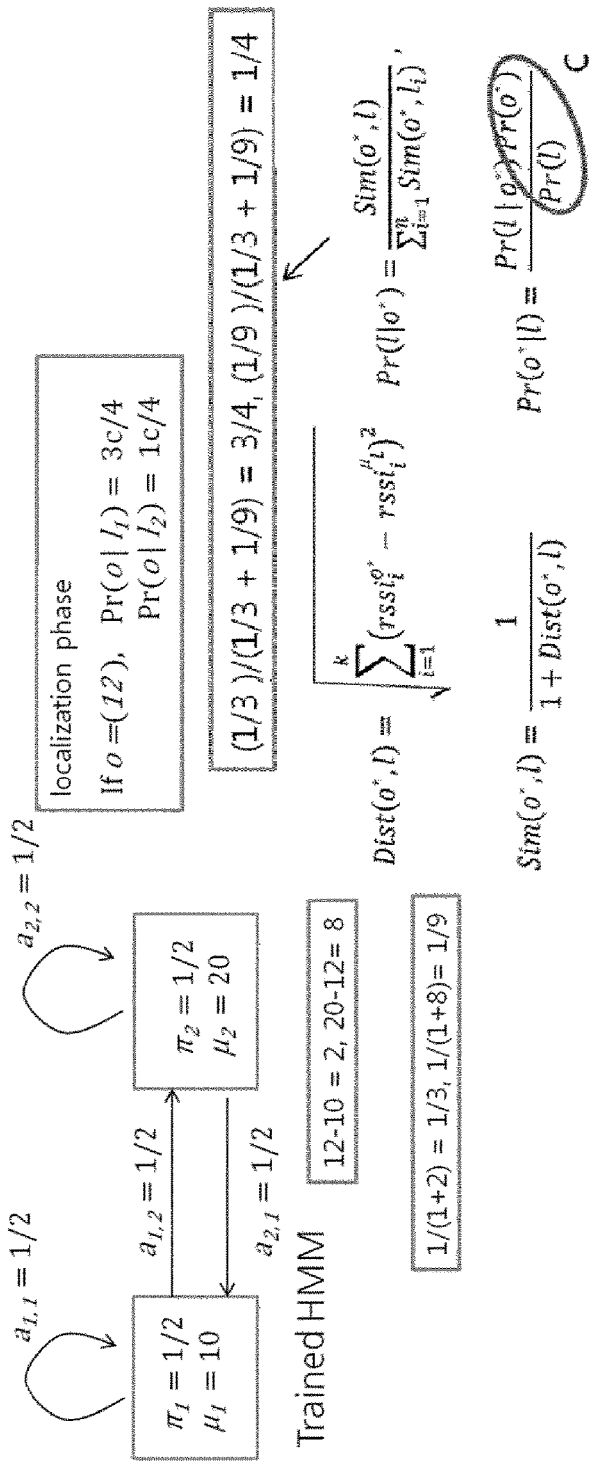
FIG. 10

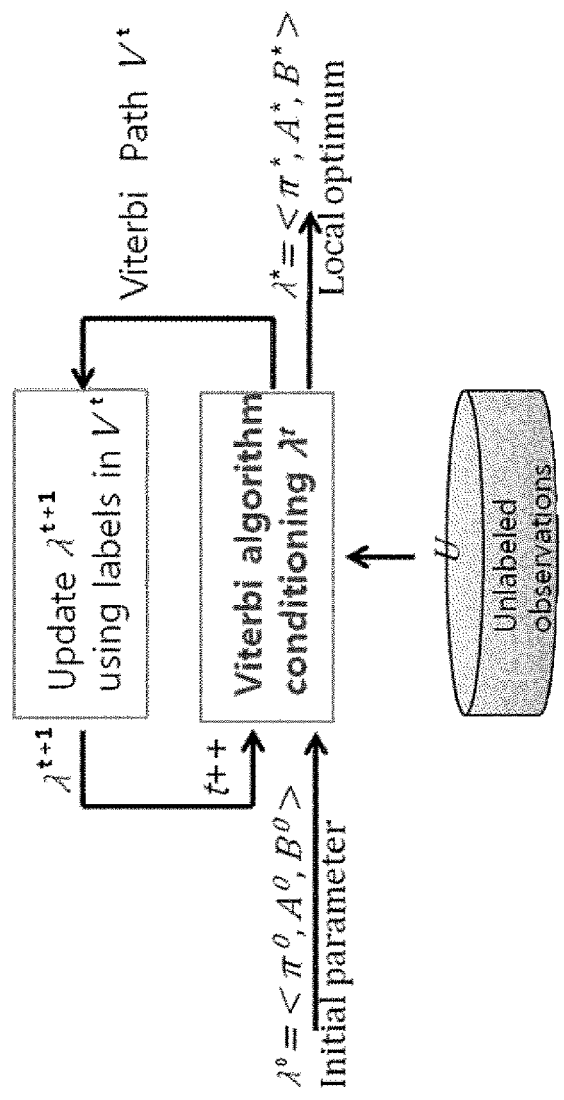
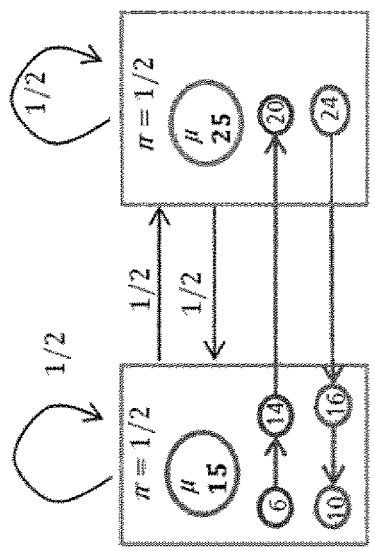
FIG. 11

$$PW_r = PW_t + 20\log\left(\frac{wl}{4\pi}\right) + 10e\log\left(\frac{1}{d}\right),$$

where
$PW_t$ is the transmit power of the AP (in dBm);
$PW_r$ is the power at the device;
$wl$ is the wave length;
$e$ is the path loss exponent ($e = 2$ in the free space);
$d$ is the distance between the AP and the device.

- Information for $\mu^o$ calculation can be encoded by
  - $PM$ : pair of $e$ for LOS and NLOS,
  - $L^{ap}$ : AP locations (AP deployment)

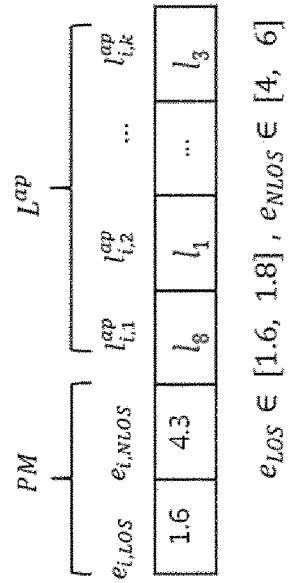

$e_{LOS} \in [1.6, 1.8]$, $e_{NLOS} \in [4, 6]$

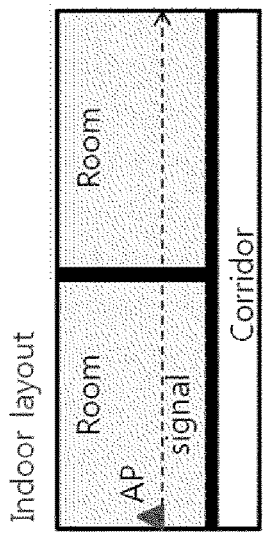

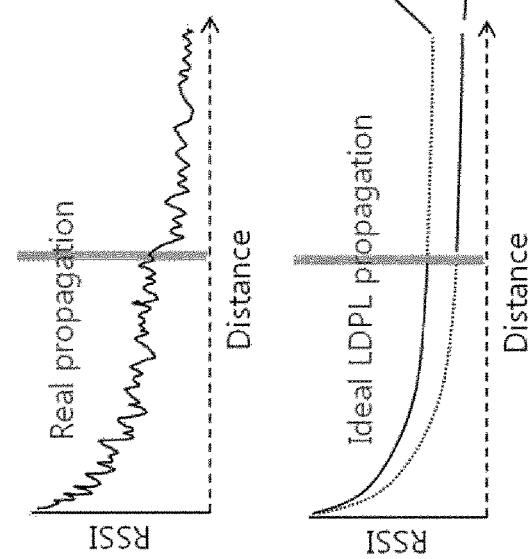

FIG. 18

AUTOMATED WLAN RADIO MAP CONSTRUCTION METHOD AND SYSTEM

CROSS-REFERENCE TO RELATED APPLICATION(S) AND CLAIM OF PRIORITY

The present application claims the benefit under 35 U.S.C. § 119(a) to a Korean patent application filed in the Korean Intellectual Property Office on Nov. 25, 2014, and assigned Serial No. 10-2014-0165022, the entire disclosure of which is hereby incorporated by reference.

TECHNICAL FIELD OF THE INVENTION

The present disclosure relates generally to indoor location information recognition technology. More particularly, the present disclosure relates to a method and system for automatically constructing a Wireless Local Area Network (WLAN) radio map which is necessary for indoor location recognition.

BACKGROUND OF THE INVENTION

As smartphones are widely used and Access Points (APs) (WLAN repeaters) are increasingly installed in recent years, there is an increasing demand for an indoor location recognition service. In reality, potential utility that can be expected by the indoor location recognition system has been recognized over the past few years, and there have been various attempts to realize an Indoor Positioning System (IPS) having widespread availability and high accuracy. In particular, the WLAN fingerprint-based technique is widely used because of its high accuracy. However, this technique requires construction of a radio map, which is a DB containing collected WLAN signals and information on locations where corresponding signals are collected.

In an indoor space where the radio map is constructed, a location recognition system is mounted in the radio map, and can easily provide location information of a mobile device having a wireless signal receiver attached thereto. The location recognition system mounted in the radio map generally finds some most similar WLAN fingerprints to the WLAN fingerprints collected by the mobile device from the radio map, and estimates a location based on information of locations where the found WLAN fingerprints were collected. Therefore, the most important work in developing the indoor location recognition systems is constructing the radio map by collecting WLAN fingerprints in indoor spaces all over the world along with information on collection locations. However, much cost and much effort are required to construct the radio map in the indoor spaces. Therefore, there is a need for an automated radio map construction technique which is improved so as to extremely save the cost and time.

There have been various attempts to reduce the cost. There is a method for constructing a radio map by driving a vehicle having a device mounted therein for collecting GPS signals and WLAN signals simultaneously, and tagging the collection points of the collected WLAN signals. In addition, there is a method for constructing a radio map using WLAN signals which are obtained along with GPS signals in a user's mobile device. However, the method of using the GPS signals as reference locations has the disadvantage that WLAN signals collected in indoor spaces are not utilized. This is because the GPS signals does not arrive in the indoor spaces. There has been an attempt to construct the radio map by automatically tagging collection points using signal information obtained by various sensors along with WLAN signals. However, this technique also requires additional costs in constructing the radio map and still has limitations in view of the availability and accuracy.

SUMMARY OF THE INVENTION

To address the above-discussed deficiencies of the prior art, it is a primary aspect of the present disclosure to provide, as a solution to reduce the cost required to construct a WLAN radio map, a method and system for automatically labeling collection locations of WLAN fingerprints, which are collected without collection location information in an indoor space, without using reference location information such as GPS signals.

According to one aspect of the present disclosure, an automated WLAN radio map construction method includes: generating a learning model based on Finite State Automata (FSA) in which divided areas of an indoor map are expressed by location states; and learning to arrange collected WLAN fingerprints in corresponding location states through machine learning based on the learning model.

The automated WLAN radio map construction method may further include collecting WLAN fingerprints obtained by a mobile device in an indoor space, and the learning may include arranging the collected WLAN fingerprints in corresponding location states.

The WLAN fingerprints obtained by the mobile device may not include location information and movement information.

The automated WLAN radio map construction method may further include storing a result of the arranging.

The learning may include: setting representative WLAN fingerprints for the location states; and arranging the collected WLAN fingerprints in the corresponding location states with reference to the representative WLAN fingerprints.

The setting and the arranging may be repeated a predetermined number of times.

The setting may include changing the representative WLAN fingerprints for the location states based on the result of the arranging.

The setting may include changing the representative WLAN fingerprints for the location states with reference to all of the WLAN fingerprints arranged.

The setting may be performed through learning using at least one of an A*algorithm, a hill climbing algorithm, a genetic algorithm, and a memetic algorithm.

The arranging may be performed through learning using at least one of an Expectation Maximization (EM) algorithm and a segmental K means algorithm.

The setting may include setting initial representative WLAN fingerprints for the location states with reference to a location state where an AP is arranged and a WLAN signal propagation model.

A number of APs included in the initial value may be variable.

The number of APs included in the initial value may be dynamically determined by increasing the number of APs until a condition in which a location range determined by trilateration is not distributed and is determined to be a single range less than or equal to a predetermined size is satisfied, and an order of the APs included in the initial value may be determined with reference to Information Gain (IG).

Some of the WLAN fingerprints may be provided with location information, and the arranging may include, with respect to the WLAN fingerprints provided with the location information, determining a location state for arranging with reference to the location information.

The location information may be provided through at least one of GPS information, information of a tag of which installation location is known, and movement information.

The learning model may be a model where the WLAN fingerprints are arranged in the FSA, and which has transition probabilities between the location states and probabilities that the WLAN fingerprints are observed as parameters.

According to another aspect of the present disclosure, an automated WLAN radio map construction system includes: a collection server configured to collect WLAN fingerprints; and a learning server configured to generate a learning model based on FSA in which divided areas of an indoor map are expressed by location states, and arrange the WLAN fingerprints collected by the collection server in corresponding location states through machine learning based on the learning model.

The collection server may be configured to collect WLAN fingerprints obtained by a mobile device in an indoor space.

The WLAN fingerprints obtained by the mobile device may not include location information and movement information.

The learning server may be configured to set representative WLAN fingerprints for the location states, and arrange the collected WLAN fingerprints in the corresponding location states with reference to the representative WLAN fingerprints.

The learning server may be configured to change the representative WLAN fingerprints for the location states based on a result of the arranging.

The learning server may be configured to change the representative WLAN fingerprints for the location states with reference to all of the WLAN fingerprints arranged.

The learning server may be configured to set initial representative WLAN fingerprints for the location states with reference to a location state where an AP is arranged and a WLAN signal propagation model.

According to exemplary embodiments of the present disclosure as described above, collection locations of WLAN fingerprints collected in a plurality of unspecific smartphones without reference location information such as GPS signals can be automatically labeled. When many WLAN fingerprints are collected in each building, a radio map for providing base information for recognizing locations in the corresponding building can be automatically constructed without manual operations, and thus cost can be dramatically reduced.

Furthermore, according to exemplary embodiments of the present disclosure, when a radio map is constructed and many people use a location recognition service in an area where the location recognition service is provided, the radio map can be automatically updated and thus can effectively respond to a change in the WLAN environment.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 4 is a view showing an example of a result of generating Finite State Automata (FSA) from an indoor map which is divided into a plurality of areas;

FIG. 6 is a view showing an example of a detailed format of a learning model initial value;

FIG. 10 is a view showing a probability that a specific fingerprint is located in a specific location state;

FIG. 11 is a view showing a state in which fingerprints are arranged in location states, satisfying a Maximum Likelihood Estimation (MLE) condition by a Viterbi algorithm;

FIG. 18 is a view showing a genotype format based on Log-Distance Path-Loss (LDPL) for global search.

Throughout the drawings, like reference numerals will be understood to refer to like parts, components and structures.

DETAILED DESCRIPTION OF THE INVENTION

Figure 1:
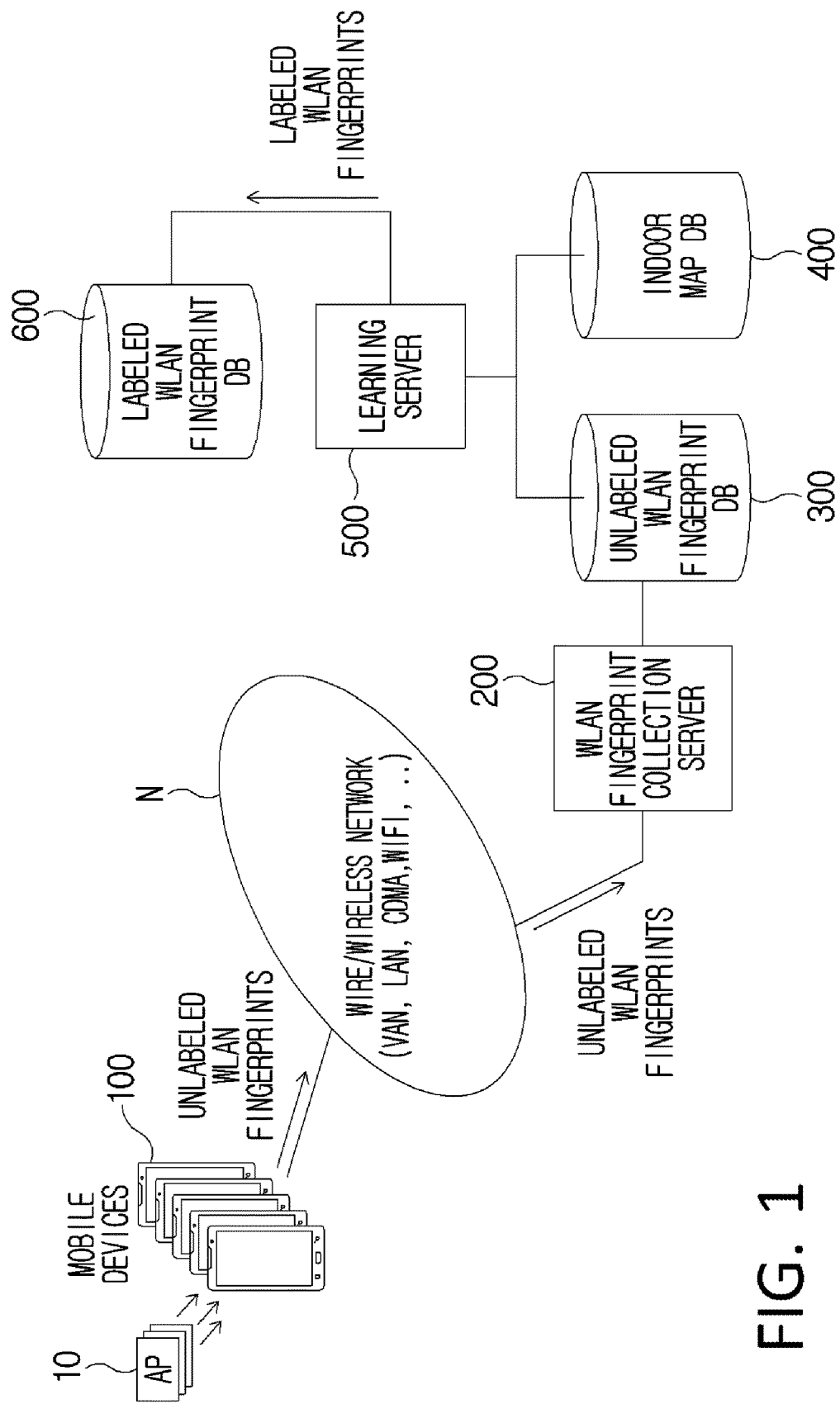
FIG. 1 is a view showing an automated WLAN radio map construction system according to an exemplary embodiment of the present disclosure.

Reference will now be made in detail to the embodiment of the present general inventive concept, examples of which are illustrated in the accompanying drawings, wherein like reference numerals refer to the like elements throughout. The embodiment is described below in order to explain the present general inventive concept by referring to the drawings.

1. Automated WLAN Radio Map Construction System

FIG. 1 is a view showing an automated WLAN radio map construction system according to an exemplary embodiment of the present disclosure. For the convenience of easy understanding and explanation, FIG. 1 illustrates APs 10 and mobile devices 100 in addition to the automated WLAN radio map construction system.

The automated WLAN radio map construction system according to an exemplary embodiment of the present disclosure refers to a system which automatically labels collection locations of WLAN fingerprints obtained through the mobile devices 100 such as smartphones.

The mobile devices 100 recited herein may be a plurality of unspecific devices, and the WLAN fingerprints may be collected without location information such as GPS signals or sensing information or movement information, which is obtained by an acceleration sensor, a gyro sensor, and a direction sensor.

The automated WLAN radio map construction system according to an exemplary embodiment of the present disclosure, which performs the above-described function, includes a WLAN fingerprint collection server 200, a unlabeled WLAN fingerprint DB 300, an indoor map DB 400, a learning server 500, a labeled WLAN fingerprint DB 600, as shown in FIG. 1.

The WLAN fingerprint collection server 200 collects unlabeled WLAN fingerprints which are obtained from the APs 10 by the mobile devices 100. To collect the unlabeled WLAN fingerprints, the WLAN fingerprint collection server 200 may be connected with the mobile devices 100 via various networks N.

Since the WLAN fingerprints collected from the mobile devices 100 do not include location information, the collected WLAN fingerprints are expressed as "unlabeled WLAN fingerprints". The unlabeled fingerprints collected by the WLAN fingerprint collection server 200 are stored in the unlabeled WLAN fingerprint DB 300.

The indoor map DB 400 stores an indoor map on a target building where a WLAN radio map is to be constructed, and herein, it is assumed that information on walls or corridors are provided.

The learning server 500 generates a learning model based on the unlabeled WLAN fingerprints stored in the unlabeled WLAN fingerprint DB 300, and the indoor map stored in the indoor map DB 400.

Thereafter, the learning server 500 performs machine learning with respect to the learning model, and determines collection locations of the unlabeled WLAN fingerprints of which collection locations are not known. Accordingly, the unlabeled WLAN fingerprints become labeled WLAN fingerprints and the labeled WLAN fingerprints are stored in the labeled WLAN fingerprint DB 600.

2. Automated WLAN Radio Map Construction Method

Figure 2:
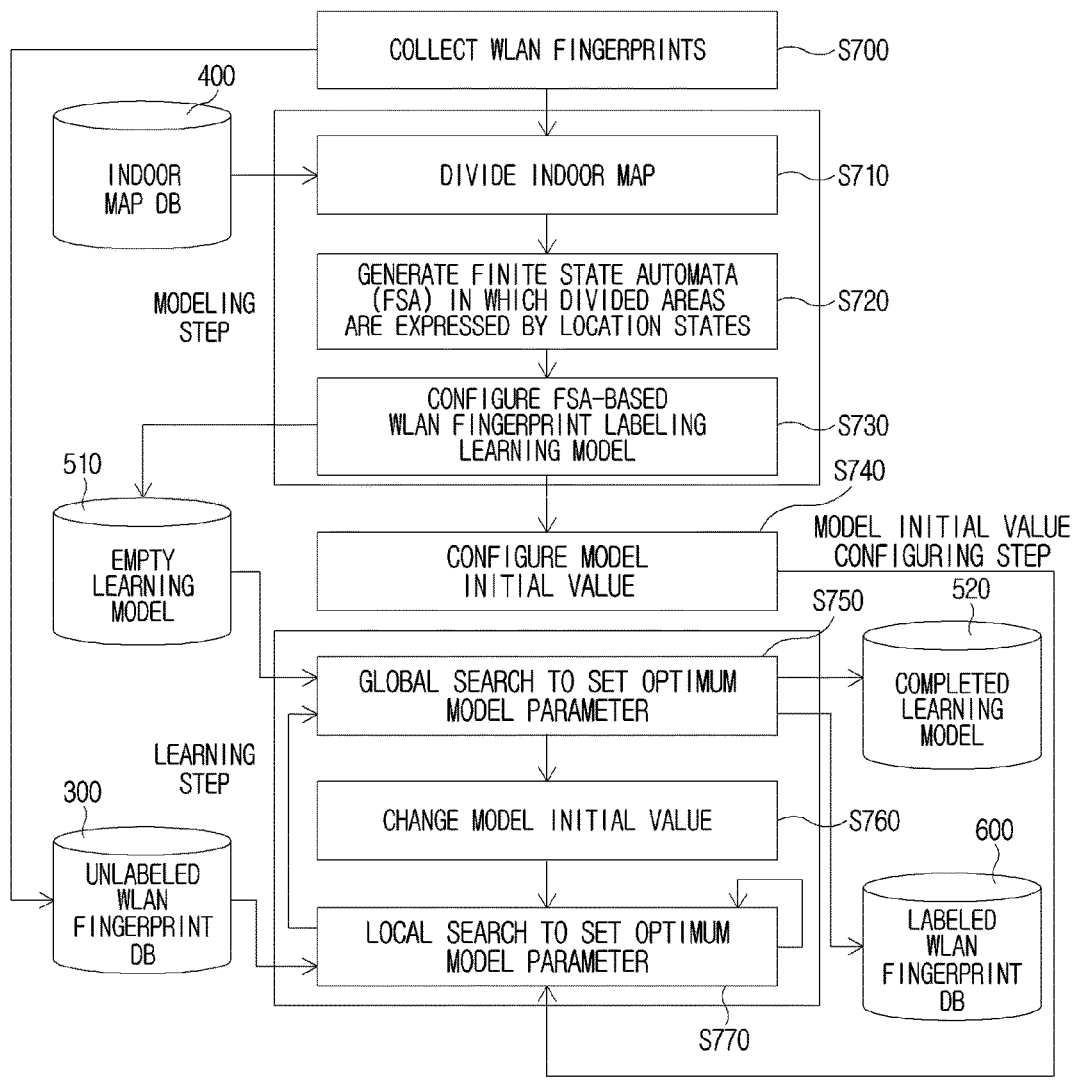
FIG. 2 is a flowchart illustrating an automated WLAN radio map construction method according to another exemplary embodiment of the present disclosure.

A process of automatically constructing a WLAN radio map by the system in FIG. 1 is illustrated in FIG. 2 in detail. FIG. 2 is a flowchart showing an automated WLAN radio map construction method according to another exemplary embodiment of the present disclosure.

As shown in FIG. 2, first, the WLAN fingerprint collection server 200 collects WLAN fingerprint sequences from the mobile devices 100 located in a building, and constructs the unlabeled WLAN fingerprint DB 300 (S700).

Since the mobile devices 100 continuously obtain the WLAN fingerprints, the WLAN fingerprints continuously obtained by a single mobile device 100 are expressed by a WLAN fingerprint sequence.

As described above, the WLAN fingerprints constituting the WLAN fingerprint sequence do not include location information and movement information.

The learning server 500 divides the indoor map which is stored in the indoor map DB 400 by a predetermined size (S710), and generates Finite State Automata (FSA) where the divided areas are expressed by location states (S720).

Thereafter, the learning server 500 generates an FSA-based empty learning model (S730). The learning model generated in step S730 is an empty learning model since WLAN fingerprints which can be observed in respective location states and other relevant parameters are not arranged (not defined) or temporary values to be changed through learning are used.

Next, the learning server 500 configures an initial parameter of the learning model (S740). In step S740, an initial value of the learning model is configured by randomly arranging the indoor APs in location states in the learning model, and assigning "representative values of WLAN fingerprints" (hereinafter, referred to as "representative WLAN fingerprints") to the respective location states based on the resulting arrangements of the APs and a WLAN signal propagation model (a model in which the strength of a signal is determined in inverse proportion to the distance between APs).

Thereafter, the learning server 500 performs local search to set an optimal model parameter (S770). Step S770 is a process of determining transition probabilities between the location states based on the representative WLAN fingerprints set in step S740, arranging the unlabeled WLAN fingerprint in the location states of the learning model, and calculating probabilities that the WLAN fingerprints are observed from the location states.

Since step S770 is performed on a basis of a location state, step 770 is expressed by local search. Step 770 may be performed through learning using an Expectation Maximization (EM) algorithm, a segmental K means algorithm, known as Viterbi Training, etc.

Next, global search is performed with respect to the learning model in which the model parameter is configured in step S770 in order to set an optimal model parameter (S750), and as a result, the representative WLAN fingerprints for the respective location states of the learning model are changed (S760).

Since step S750 is performed with respect to the entire learning model, step S750 is expressed as global search. Step S750 may be performed through learning using an A* algorithm, a hill climbing algorithm, a genetic algorithm, a memetic algorithm, etc.

Next, step S770 is performed again and thus the local search and the global search are performed continuously and repeatedly. In this process, the representative WLAN fingerprints for the location states are changed based on the arrangements state of the entire WLAN fingerprints, and the location states in which the WLAN fingerprints are arranged are changed by the change in the representative WLAN fingerprints. This procedure is repeated.

This repeating process continues until the model parameter is not changed even by the global search (that is, until the model parameter is optimized) or the model parameter is slightly changed.

3. Detailed Explanation of Each Step

3.1. Collecting WLAN Fingerprints

The WLAN fingerprint sequence may be obtained when the mobile device 100 is being moved or is stopped. The WLAN fingerprint sequence may be obtained through a WLAN fingerprint collection device mounted in a drone flying in the building, in addition to the mobile device 100.

3.2 Dividing Indoor Map

This procedure is the first procedure of the modeling step, and is dividing the indoor map of the target building by a predetermined size. The wall and corridors of the building are marked in the indoor map.

Figure 3:
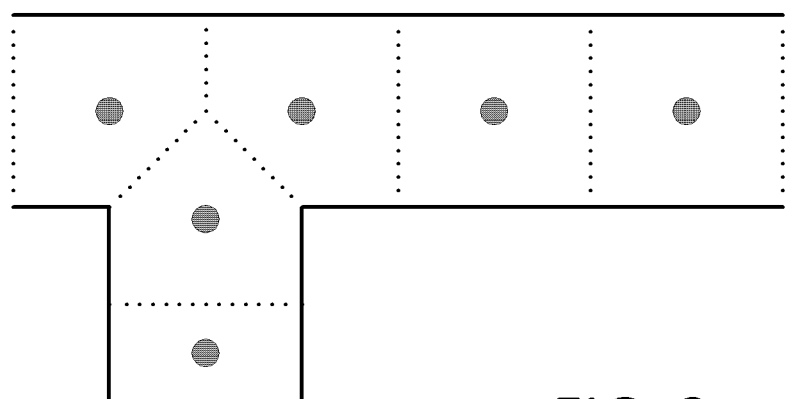
FIG. 3 is a view showing an example of a result of dividing an indoor map.

The predetermined size may be a size from which an ordinary person deviates within 1-2 seconds at normal walking pace, or a size of a polygon having a side of 2-3 meters or 3-4 meters with reference to a size divided using a WLAN. Therefore, the number of divided areas may be hundreds, thousands, or tens of thousands for a single building. FIG. 3 illustrates an example of a divided indoor map.

3.3 Generating FSA

The FSA is a state diagram which is a base for configuring the learning model, and the states of the FSA indicate the areas divided as described above. Therefore, when the number of divided areas is 1,000, the generated FSA have 1,000 location states.

In addition, an area that a person can arrive at from each area within several seconds (that is, a location state) is connected by a transition probability. The location state of a neighboring area is normally connected by a transition edge. Each of the location states has an edge returning to its own state.

FIG. 4 illustrates an example of a result of generating FSA from the indoor map which is divided into a plurality of areas.

3.4 Configuring Learning Model

According to an exemplary embodiment of the present disclosure, the learning model is a machine learning model for labeling the WLAN fingerprints based on the FSA. The learning model assigns the transition probability between the location states of the FSA. The transition probability refers to a probability of transition from one location state to another location state.

The learning model does not have the WLAN fingerprints arranged in the respective location states, and the WLAN fingerprints are arranged through a learning process described below.

Figure 5:
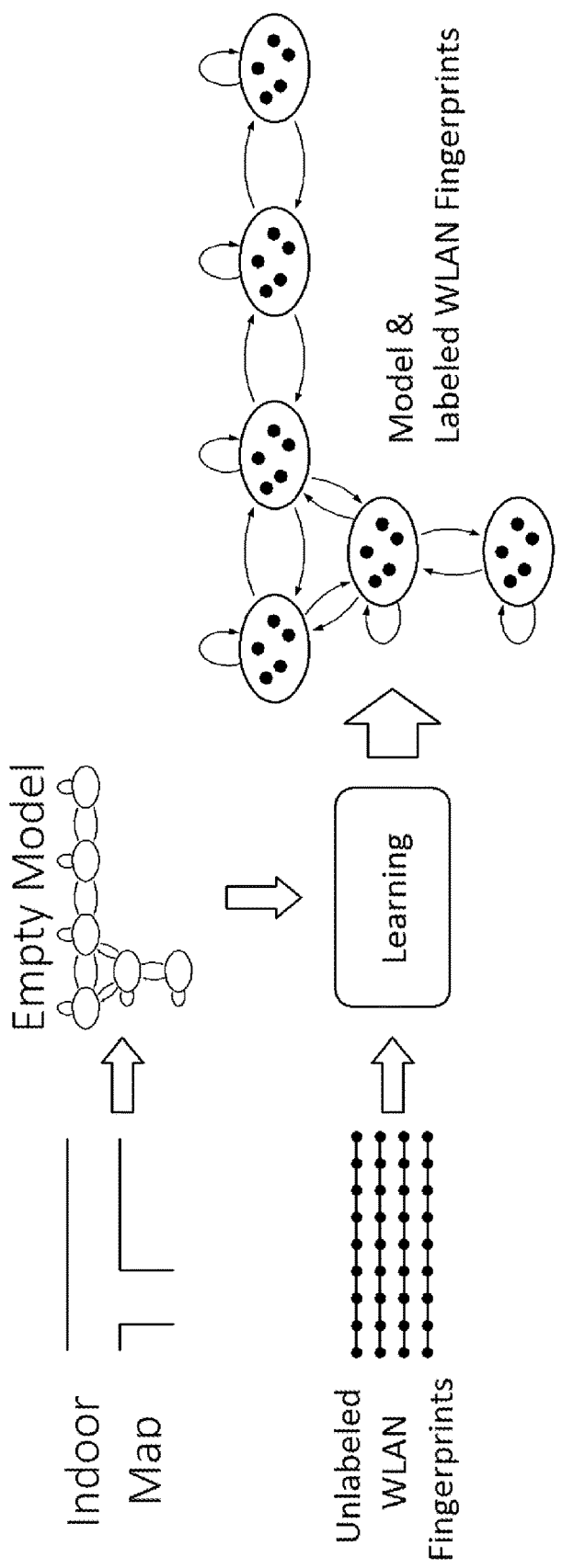
FIG. 5 is a view showing a learning process.

The learning process is a process of arranging the unlabeled WLAN fingerprints in the learning model configured based on the FSA generated from the indoor map through machine learning, and calculating the transition probabilities between the location states and probabilities that the WLAN fingerprints are observed from the respective location states, and is illustrated in FIG. 5 and will be explained in detail below.

The probabilities that the WLAN fingerprints are observed may be calculated using a Maximum Likelihood Estimation (MLE) technique or other techniques.

3.5.1 Setting Learning Model Initial Value

The step of setting the learning model initial value is essential to the learning model. In addition, the model initial value much influences the effect of reducing a search space (that is, a solution space) of the learning model. Since a generally generated learning model has normally hundreds or thousands of location states, and there may be dozes to hundreds of APs based on which the WLAN fingerprints are collected, a very large search space is formed. If such a large search space is not reduced, much time is required to learn and thus it is difficult to utilize a model in practice.

According to an exemplary embodiment of the present disclosure, the learning model initial value is configured to determine the locations of the APs 10 and combine propagation models of WLAN signals so as to drastically reduce the search space of the learning model, and FIG. 6 illustrates an example of a detailed format of the learning model initial value.

Two fields, indicating a signal propagation model, $e_{i,LOS}$ and $e_{i,NLOS}$, refer to Pass Loss Exponents of a Line of Sight (LOS) and a None Line of Sight (NLOS) of the i-th solution. The following equation expresses an Log-Distance Path-Loss (LDPL) signal propagation model which is influenced by an e value:

$$PW_r = PW_t + 20\log\left(\frac{wl}{4\pi}\right) + 10e\log\left(\frac{1}{d}\right)$$

where PWt is transmission power of an AP, PWr is reception power of a mobile device, wl is a wavelength, e is a path loss exponent (e=2 in free space), and d is a distance between an AP and a mobile device.

The initial value of the learning model is configured by finding indoor APs from the WLAN fingerprints, randomly arranging the found APs in the location states in the learning model, and assigning the representative WLAN fingerprints to the respective location states based on the resulting arrangements of the APs and the WLAN signal propagation model.

3.5.2 Technique for Selecting AP to Reduce Search Space

The size of the model initial value input determines the size of the search space of the learning model. Accordingly, reducing the size of the input is crucial to reducing the size of the search space.

In the above-described example, the size of the input is reduced using a signal propagation model. However, according to an exemplary embodiment, the size of the input is further reduced by selectively including a used AP in the input, and thus the size of the search space is further reduced.

According to an exemplary embodiment, in selecting an AP to be used for the input, the number of APs to be included in the input is not defined in advance. That is, the number of selected APs is dynamically determined by increasing the number of APs until a condition in which a location range determined by trilateration of a selected AP is not distributed and is determined to be a single range less than or equal to a predetermined size is satisfied.

However, in determining the order of selecting a candidate AP to be included in the input, a normal reference such as Information Gain (IG) is used. The following is an AP selection algorithm for selecting an n number of APs for a single location state, which is suggested in an exemplary embodiment of the present disclosure:

--- n=dimensionality of the indoor space of interest
AP=set of APs sorted by IG
O=set of observations
SELECT=< >
For ap in AP, until all o in O has more than n+1 aps
    Add ap to SELECT

```
    Sort SELECT by IG descending
    FOR ap in SELECT
        If all o in O has more than n+1 aps without ap
            Remove ap from SELECT
```

3.5.3 Search Space

Hereinafter, for the easy understanding of a searching process which will be described below, the configuration of a search space including a solution containing collection location information of the WLAN fingerprints, and a process of finding the solution through global search and local search will be explained. First, it is assumed that, in an indoor space consisting of location states $L_1$ and $L_2$, a single signal repeater $AP_1$ is observed by signal sequences $F_a$=<$a_1$, $a_2$>, $F_b$=<$b_1$, $b_2$> each consisting of two fingerprints.

In this case, the search space includes a case where the signal repeater $AP_1$ is located in location state $L_1$ or $L_2$. The number of cases where all fingerprints U={$a_1$, $a_2$, $b_1$, $b_2$} are arranged in location states $L_1$ and $L_2$ when $AP_1$ is located in each location state $L_1$ or $L_2$ may be expressed by the tree shown in FIG. 7. There may be various methods for configuring the tree, but the same nodes are included in the tree regardless of the shape of the tree. Substantially, the tree formed in this way is a search space containing a solution to be found in the present disclosure.

Figure 7:
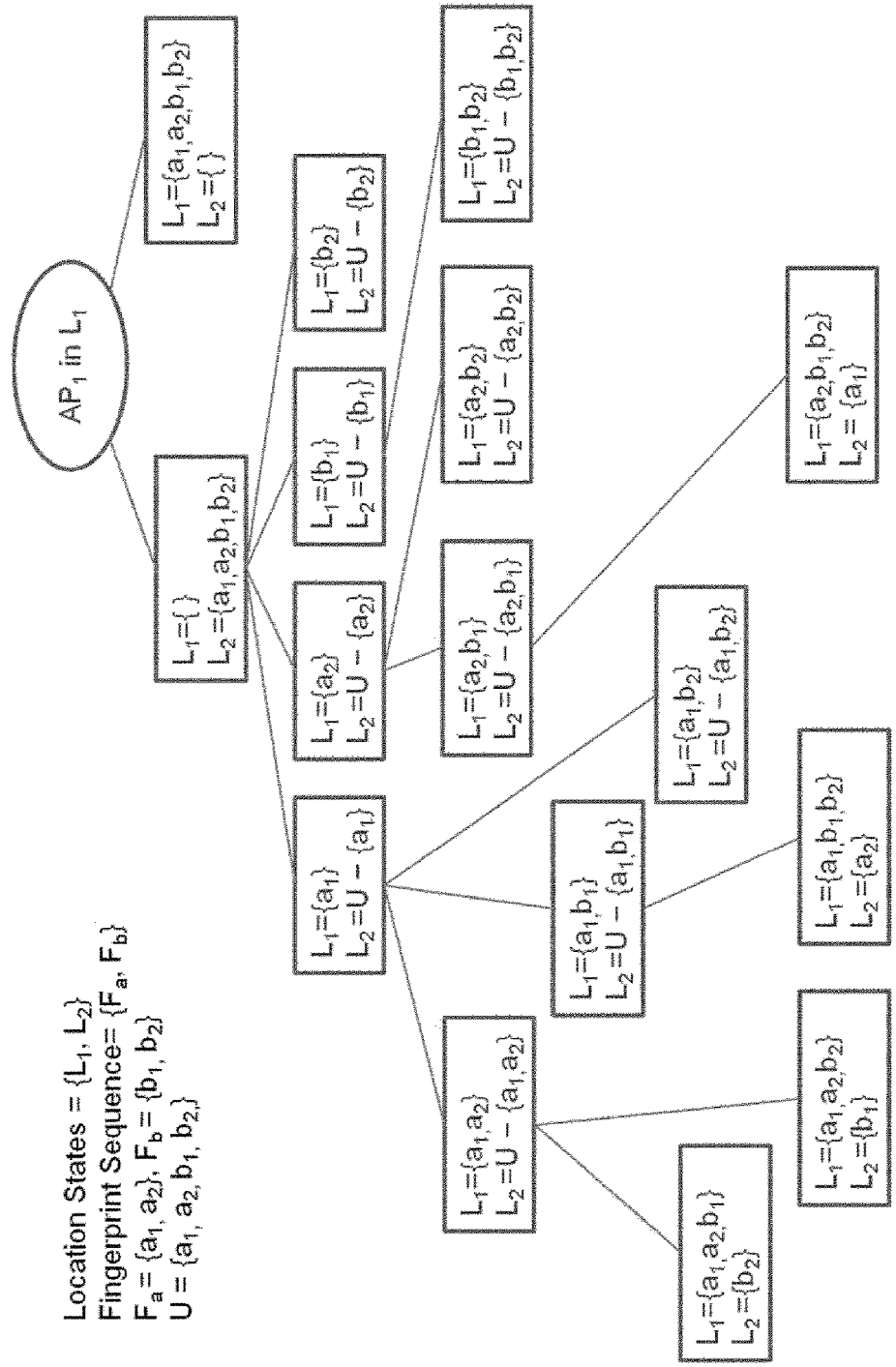
FIG. 7 is a view showing a search space which is configured on the assumption that $AP_1$ is located in location state $L_1$.

FIG. 7 illustrates a search space which includes 16 nodes (except for a root node) configured on the assumption that the signal repeater $AP_1$ is located in location state $L_1$. Since the signal repeater $AP_1$ may be located in location state $L_2$, a search space of the same size as in FIG. 7 may be formed on the assumption that the $AP_1$ is located in location state $L_1$.

The object to be achieved by exemplary embodiments of the present disclosure is to find a node having the highest probability of occurrence in the search space formed based on given conditions and restrictions. To achieve this, a method or equation for calculating a probability of occurrence of each node is required. In an exemplary embodiment, the probability of occurrence of each node may be calculated using a Maximum Likelihood Estimation (MLE) technique. Any method for calculating the probability of occurrence of each node may be used. In calculating, a moving distance of one person or information on the time required to collect the fingerprints constituting a signal sequence may be additionally used, so that the probability of occurrence of each node can be calculated more exactly.

When a certain node having the highest probability of occurrence is selected in this method, a collection location is determined based on information owned by the node. That is, when the node configured by $L_1$=<$a_1$, $a_2$>, $L_2$=<$b_1$, $b_2$> has the highest probability of occurrence, fingerprints {$a_1$, $a_2$} may be regarded as being collected from location state $L_1$ and fingerprints {$b_1$, $b_2$} may be regarded as being collected from location state $L_2$.

3.6 Searching Method

As the number of existing APs increases and the number of location states increases, the search space configured in the above-described method explosively expands and thus it is difficult to compare all of the nodes existing in the whole search space within an appropriate time. A global-local search alternating method suggested in the exemplary embodiments of the present disclosure aims at obtaining an optimum solution within an appropriate time even through the search space explosively expands. By using global search and local search alternately and searching only a search space satisfying an appropriate condition, an optimum value, that is, an optimum node, can be found within an appropriate time without having to search the whole search space. To achieve this, a segmental K-means training method may be used for local search and a genetic algorithm (or a magnetic algorithm which is an extended genetic algorithm) may be used for global search.

Figure 8:
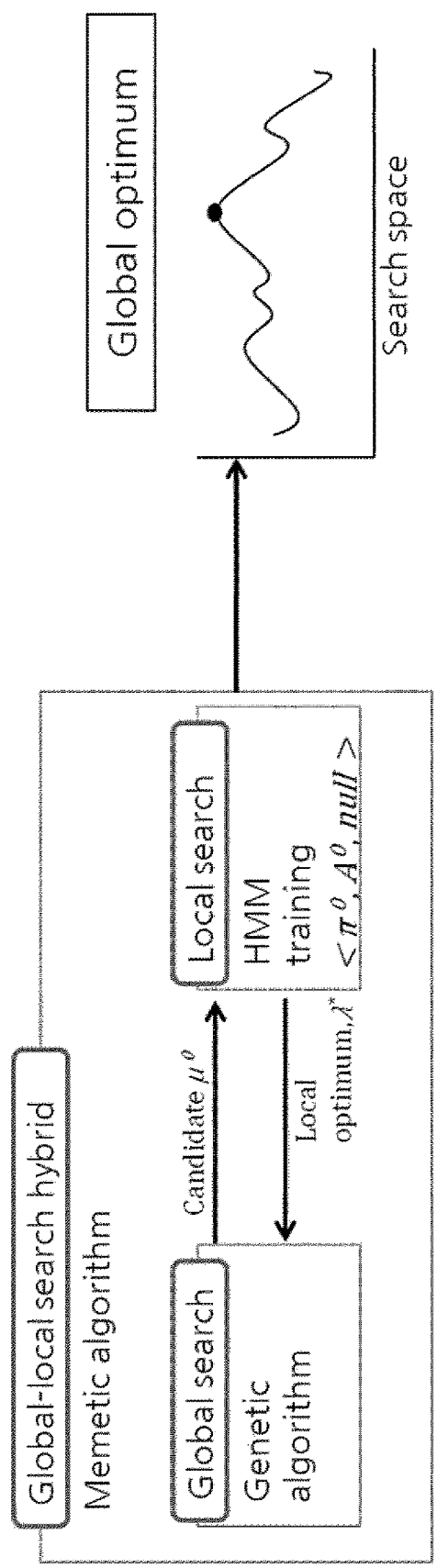
FIG. 8 is a view showing a concept of a process of obtaining a total optimal solution in a search space using global search and local search alternately.

When only the local search is used, the total optimum value may not be calculated since the optimum value may miss from the local optimum value. Therefore, the global search and the local search are used alternately. FIG. 8 shows a brief process of obtaining an optimum value using local search and global search alternately. As shown in FIG. 8, when an initial value is given through global search, a local optimum value is found through local search, and, when the found value is provided to a global search module, a new initial value is generated by referring to this value along with a previously obtained value, and is provided to a local search module. This process is repeated. The number of times of repeating is normally determined by a predetermined value. In particular, FIG. 8 shows the local search performed on the assumption that learning is performed based on an HMM. However, any method that can obtain an optimum value through global search may be used.

3.6.1 Local Search to Set Optimum Model Parameter

The local search is a process for finding optimum location states for arranging unlabeled WLAN fingerprints based on the representative WLAN fingerprints set in the initial stage or determined through the global search.

As the global search and the local search are repeated, the parameters of the learning model are changed and evolve, thereby becoming a completed learning model. In this process, the unlabeled WLAN fingerprints are completely arranged.

The WLAN fingerprints arranged in the corresponding location states are regarded as having been collected in areas indicated by the corresponding location states, and the labeling the WLAN fingerprints is terminated by storing the result in the labeled WLAN fingerprint DB 600.

The result of the local search is converted into a model initial value design format (a combination of an installation location of an AP and a propagation model of a signal) through inverse function and regression analysis according to an algorithm of the global search, and may be used to increase the efficiency of the global search.

Figure 9:
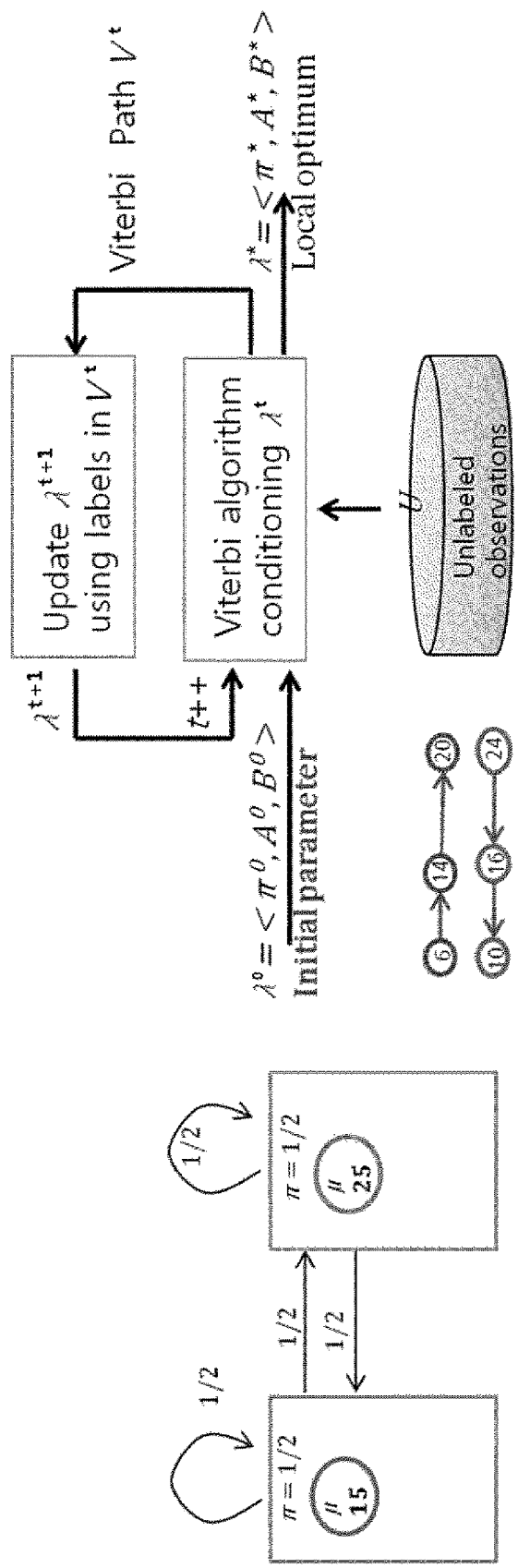
FIG. 9 is a view showing a segment K-means training start step.

Hereinafter, the local search process suggested in the exemplary embodiments of the present disclosure will be explained in detail. The local search process will be described based on a process of arranging fingerprints in location states with respect to two fingerprint sequences observed in a space having two location states through the segmental K-means training. However, in the corresponding space, only one AP is installed and the numbers in each drawing mean strengths of virtual signals obtained in the corresponding AP. In FIG. 9, it is assumed that the above-described model (or HMM) is given an initial parameter value of $\lambda^0$ and <6, 14, 20> and <10, 16, 20> are provided to two fingerprint sequences observed. In addition, it is assumed that the strengths of the WLAN signals obtained in the respective location states in the initial state are 15 and 25, respectively. That is, it is assumed that the AP places the two location states [location state 1 (the left rectangle of FIG. 9) and location state 2 (the right rectangle of FIG. 9)]. The strength of a normal AP signal is distributed between −30 dBm and −90 dBm, but a positive integer is used herein for the convenience of explanation.

When the segmental K-means training starts as the initial value is given as shown in FIG. 9, a combination of states showing the highest probability that the fingerprints existing in the two sequences are arranged in respective location states is selected by a Viterbi algorithm. To drive the Viterbi algorithm, a probability that a specific fingerprint is arranged in a specific location should be calculated. FIG. 10 shows a method for calculating the probability that a specific fingerprint is arranged in a specific location state when the parameter of the HMM is determined.

FIG. 10 shows a process of calculating a probability that, when fingerprint f having strength 12 is observed with the parameter of the HMM being generated, fingerprint f is arranged in location state 1 or 2.

The probability distribution to be observed when fingerprint f is arranged in location state 1 is calculated as follows. First, an Euclidean distance of strength 12 of f and average strength 10 of location state 1 is calculated as $[(12-10)^2]^{1/2}=2$ using the following equation:

$$Dist(o^*, l) = \sqrt{\sum_{i=1}^{k} (rssi_i^{o^*} - rssi_i^{\mu_l})^2}$$

From the above equation, signal similarity may be calculated as $1/(1+2)=1/3$ using the following equation:

$$Sim(o^*, l) = \frac{1}{1 + Dist(o^*, l)}$$

A probability that collected fingerprint f is observed in location state 1 is calculated by the following equation:

$$Pr(l | o^*) = \frac{Sim(o^*, l)}{\sum_{i=1}^{n} Sim(o^*, l_i)}$$

Herein, fingerprint f is regarded as o* and processed. According to the above-described equation, the probability that, when WLAN fingerprint f is obtained, the location is location state 1 is $(1/3)/(1/3+1/9)=3/4$, and, the probability that fingerprint f included in a given fingerprint sequence is obtained in location state 1 is calculated by the following equation:

$$Pr(o^* | l) = \frac{Pr(l | o^*)Pr(o^*)}{Pr(l)}$$

When Pr(1) and Pr(o*) in the above equation are treated as constant values, the value of the above equation may be expressed by Pr(l|o*)C. Accordingly, Pr(f|location state 1) equals 3C/4. In the same method, Pr(f|location state 2) equals C/4.

In this method, the probability values of the fingerprints are added for all possible combinations of arrangements, and the optimal arrangement having the greatest value can be found.

FIG. 11 shows a state in which arrangements for the two sequences are completed and the fingerprints constituting the two fingerprint sequences are arranged in respective location states.

Figure 12:
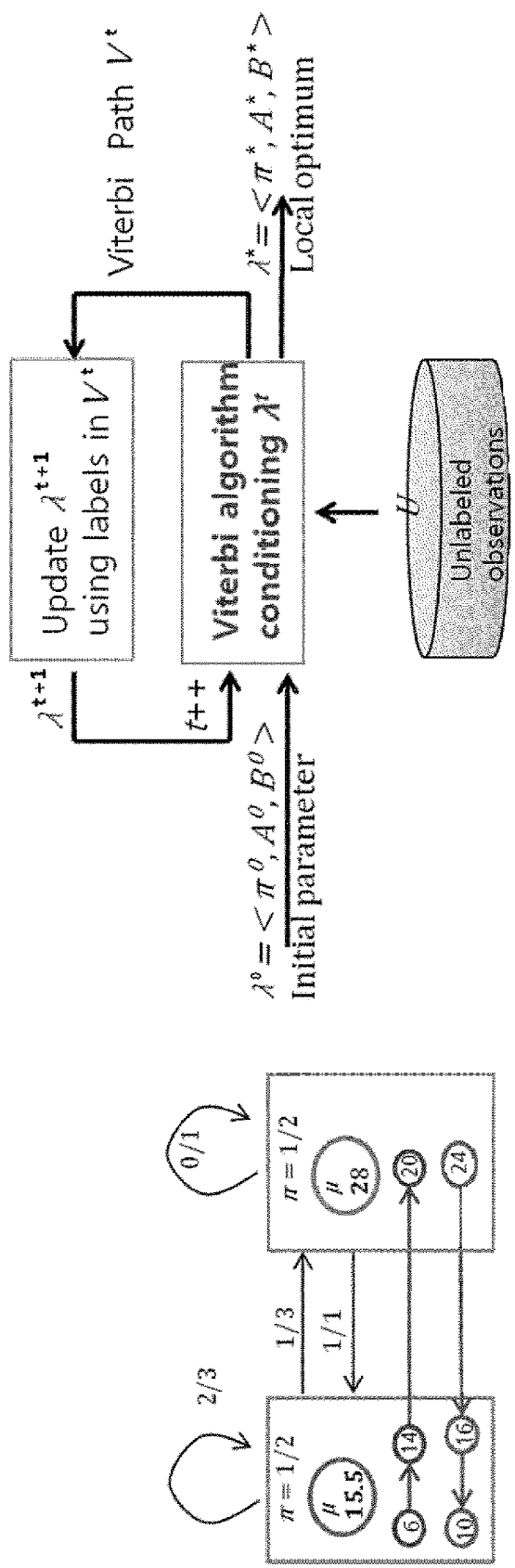
FIG. 12 is a view showing a state in which fingerprints are arranged in location states by a Viterbi algorithm.

When the arrangement is completed as shown in FIG. 11, the model parameter is changed by reflecting the information of the fingerprints arranged. In the above case, fingerprints having AP signal strengths 6, 14, 10, 16 are newly arranged in location state 1 such that average signal strength is 15.5, and is changed to 22 in the case of location state 2. FIG. 12 shows the changed state.

Figure 13:
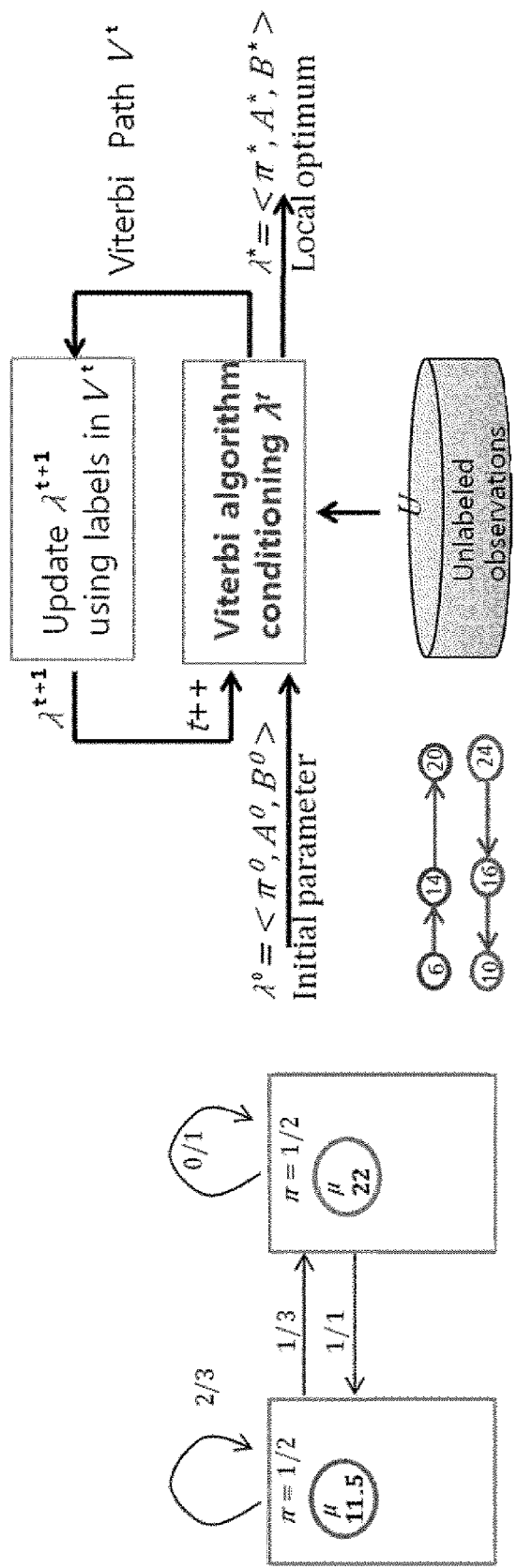
FIG. 13 is a view showing a state in which parameter values are changed and return to an initial state.

When the parameter is changed as shown in FIG. 12, the Viterbi algorithm is applied again using the changed parameter and the same process is repeated. FIG. 13 shows a state in which the initial step resumes after the parameter value is changed. As the learning is repeated, the parameter value of the HMM model is changed, but the same fingerprints are used as input.

The process of changing the parameter value and the process of arranging the fingerprints through Viterbi Path detection are repeated until no more model parameter is changed. When the repeated learning is terminated, a final HMM parameter is obtained. However, this state is not regarded as a final state where the learning is terminated in the exemplary embodiments of the present disclosure. This is because the optimum value may miss from the local optimum value. To solve this problem, the global search is performed.

3.6.2 Global Search to Set Optimum Model Parameter

The learning model sets an optimum model parameter by repeating the local search and the global search in order to optimally arrange the WLAN fingerprint sequences given by input of learning in the indoor space.

The global search to set the optimum model parameter sets a representative WLAN fingerprint to be used in the local search. There are various algorithms for the global search. The A* algorithm, hill climbing algorithm, genetic algorithm, and memetic algorithm may be used for the global search.

The main object of the global search is to expand the search space since the local search is optimum search for partial areas, but may not be optimum search for the whole space.

The global search utilizes the result obtained in the previous local search step and allows a WLAN fingerprint different from the representative WLAN fingerprint used in the previous local search to be used in the next local search step.

The process of repeating the local search and the global search is repeated until a pre-defined criterion (for example, the number of APs included in the initial value or the number of times of repeating the search) is satisfied.

Figure 14:
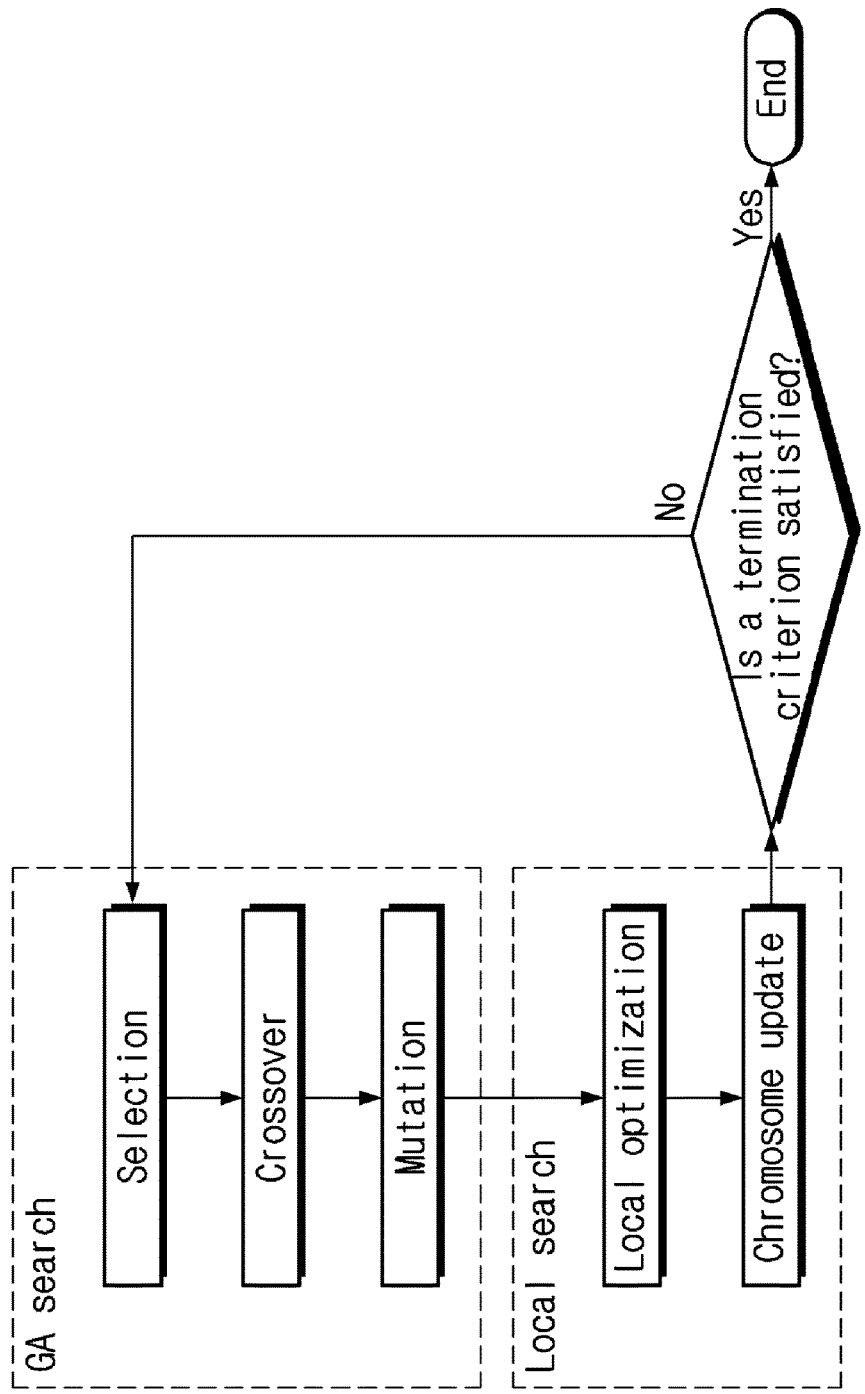
FIG. 14 is a flowchart of a process associated with local search and global search.

Hereinafter, the global search will be explained using the memetic algorithm which is an enhanced genetic algorithm. As shown in FIG. 14, through the global search, the search space evolves by creating a new descendant by reflecting selection, mutation, and cross-over of a gene, based on the result obtained in the local search, and a new initial value for the local search is transmitted. FIG. 14 illustrates integrated global search and local search.

As shown in FIG. 14, the global search provides the initial value of the local search, and the local search provides information necessary to create the descendant by evolving in the global search.

When a model template $<\pi^0, A^0, null>$ is given (herein, $\pi^0$ is an initial value of a probability that observation in each location state starts, and $A^0$ is a transition matrix containing information on a probability of transition between location states), the genetic algorithm serves to find corresponding $\mu_0$. $\mu^0$ refers to average signal strength observed in each location state. When it is assumed that a target space includes k number of location states, there are n number of different location states, and there are m number of signals observed in specific location state 1 like $\{\mu_{11}=(rssi_1, rssi_2, rssi_3, \ldots), \mu_{12}=(rssi_1, \ldots), \ldots, \mu_{1m}=(rssi_1, \ldots)\}$, there are as many combinations as $d^{nk}$. Herein, d is the number of different WLAN signal strengths, and, when it is assumed that there are 90 different WLAN signal strengths, there are 200 location states, and there are 100 different APs, a search space corresponding to $90^{100*200}$ is formed.

The global search and the local search are connected with each other and are performed alternately. However, the global search is performed for the purpose of determining a new initial value to perform the local search, and the local search serves to find an optimum combination for arranging the respective fingerprints in location states based on the given initial value and the collected WLAN fingerprint sequence.

As described above, the local search and the global search are different from in view of their performance objects, and thus the format of input used in the local search is different from the format of input used in the global search. The format of input used in the local search is referred to as a phenotype, and the format of input used in the global search is referred to as a genotype. In an exemplary embodiment of the present disclosure, the same format of input as the above-described model initial value format is used as the genotype. Therefore, when the local search and the global search are alternated, the phenotype and the genotype are exchanged with each other.

Figure 15:
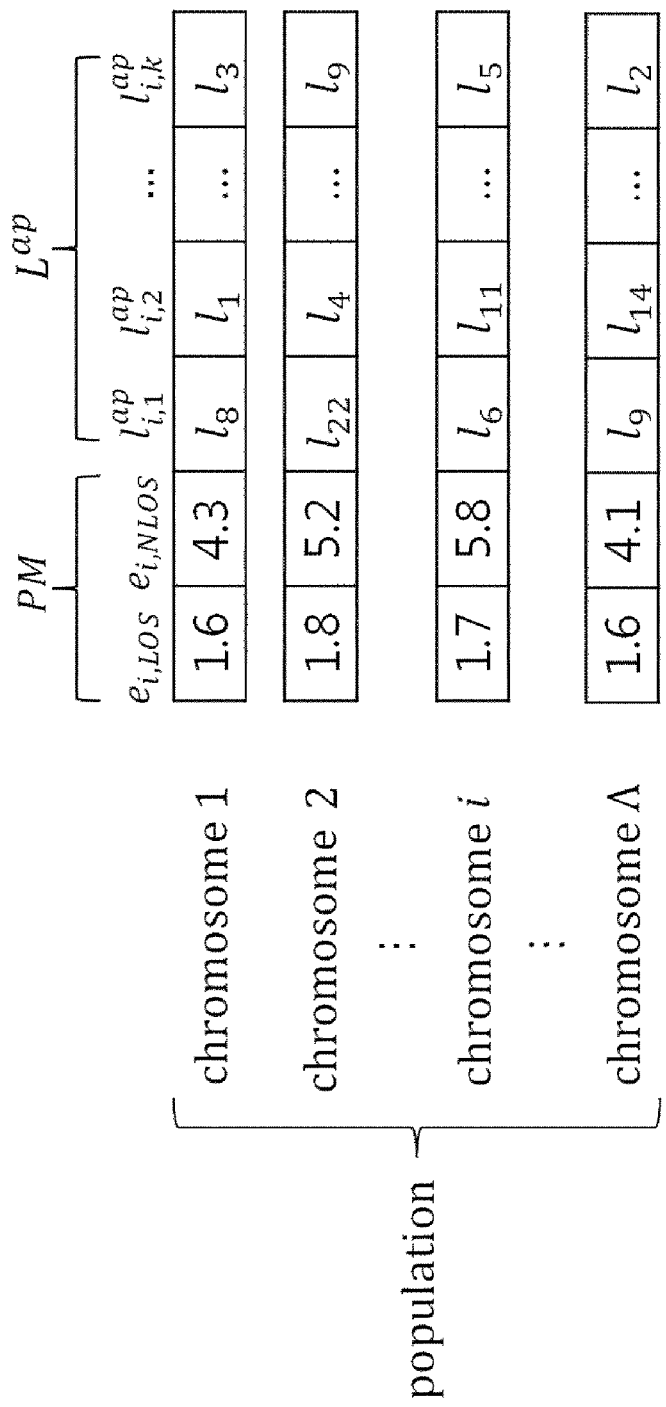
FIG. 15 is a view showing a part of a population configured for global search.

In the global search based on the genetic algorithm, about 100 first generation populations are prepared at the initial stage, and evolve by increasing the generations. Normally, it depends on what field is applied, but a resulting value is normally derived when about 100 generations evolve. FIG. 15 shows a part of the population configured for the global search.

3.6.3 Changing Representative WLAN Fingerprints

In the step of changing the WLAN fingerprints, the initial value is changed such that the local search for optimally arranging the WLAN fingerprint sequence given by the input of the learning in the indoor space is performed.

When the genetic algorithm or memetic algorithm is used, a combination thereof may configure dozens to hundreds of inputs (so-called populations) in advance and drive the learning model. In addition, the learning proceeds as the representative WLAN fingerprint in each location state evolves into a new representative WLAN fingerprint through selection, cross-over, and mutation in the process of the local search and the global search.

3.7 Reducing Search Space

Figure 16:
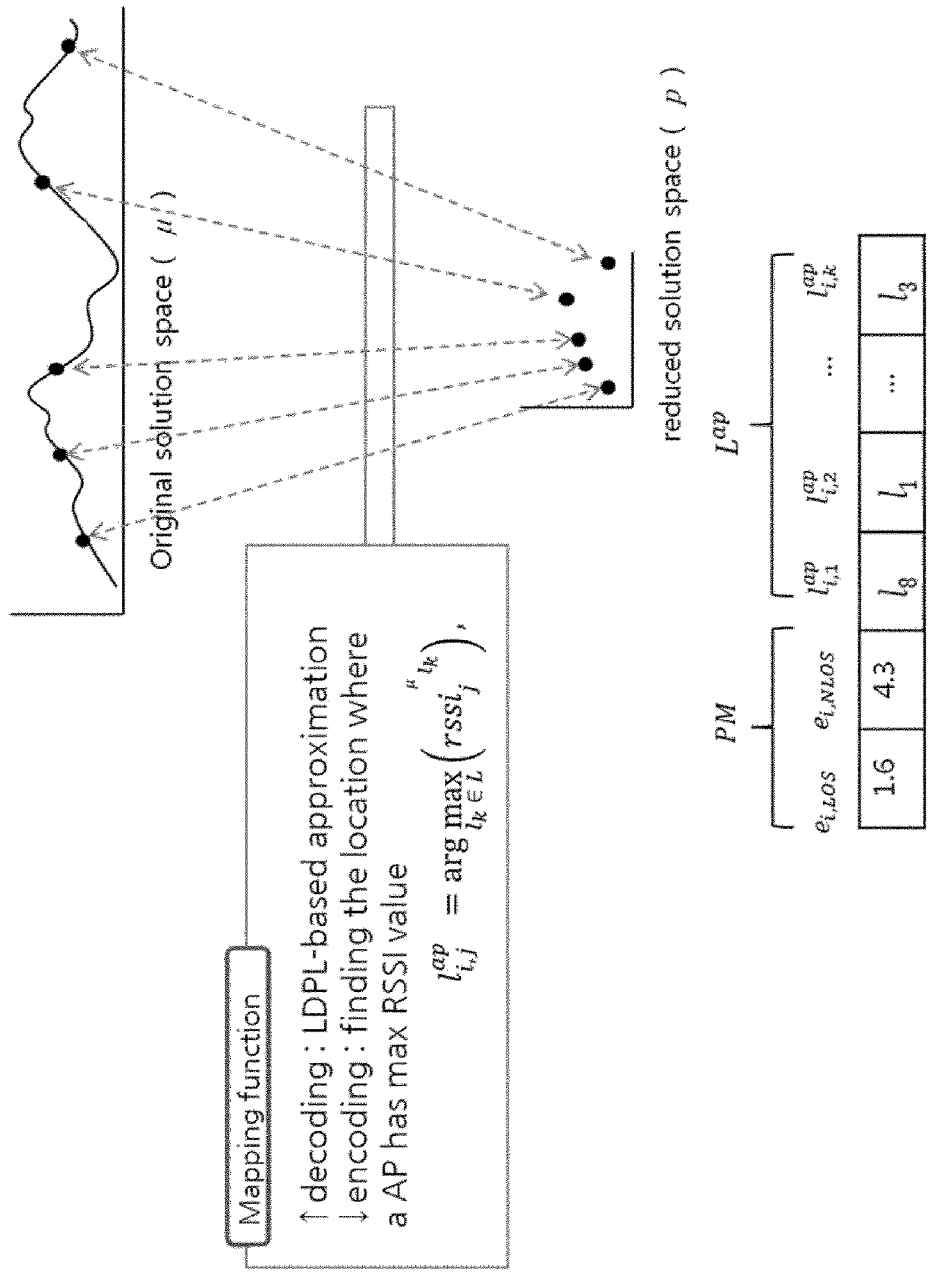
FIG. 16 is a view showing a concept of search space reduction.

As described in the explanation of the global search, the search space $d^{nk}$ is a very large space. Therefore, the search space should be reduced in order to utilize the technique suggested in the exemplary embodiments of the present disclosure in practice. The search space may be drastically reduced by performing search with respect to only WLAN signal strength of an appropriate range in the whole search space of the size ($d^{nk}$) by considering the characteristics of the WLAN signal (reducing value d), and limiting the number of APs to be searched to a minimum number that can influence the location information (reducing value n). FIG. 16 illustrates a concept of drastic reduction in the search space using the technique suggested in the present exemplary embodiments of the present disclosure.

Figure 17:
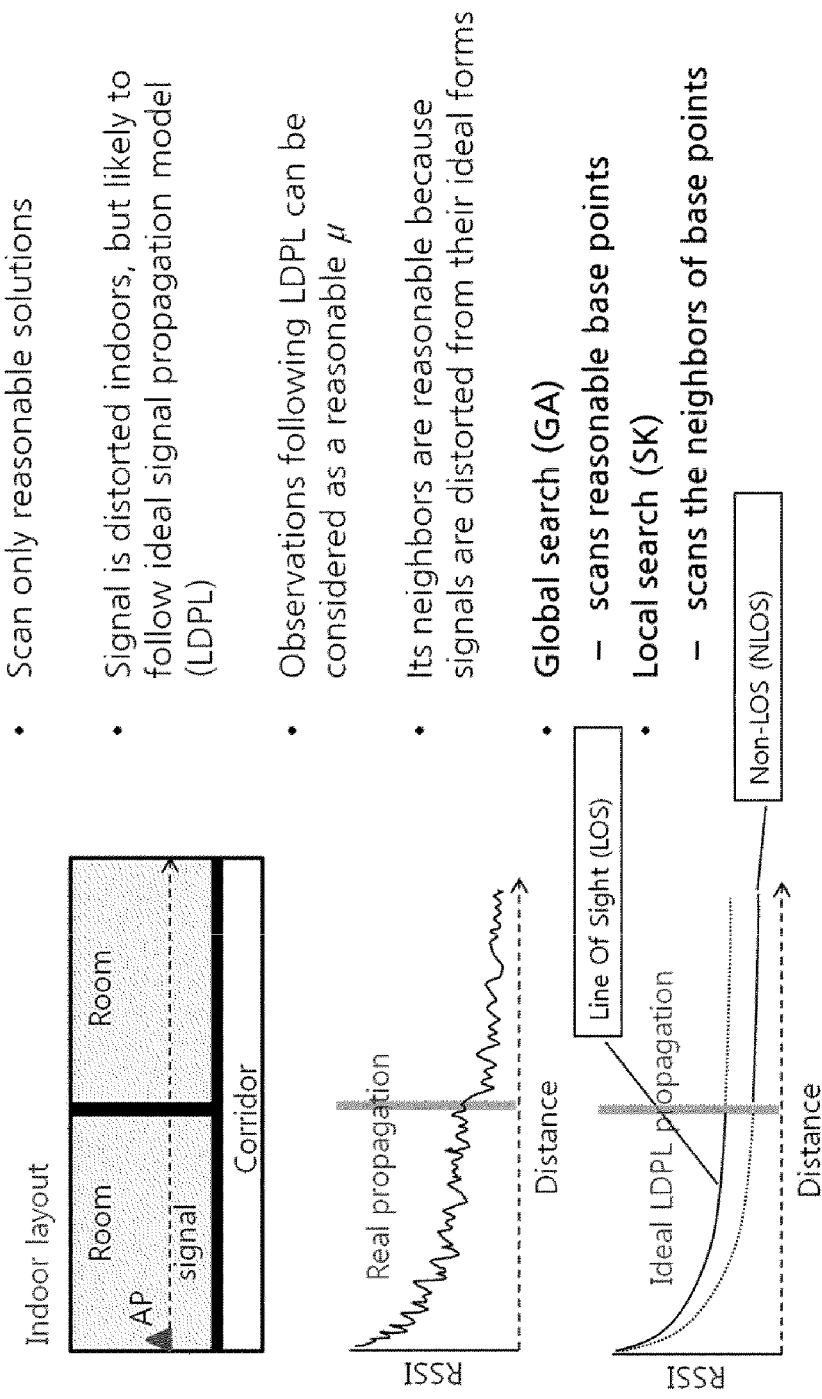
FIG. 17 is a view showing a basic strategy to reduce a search space.
Figure 19:
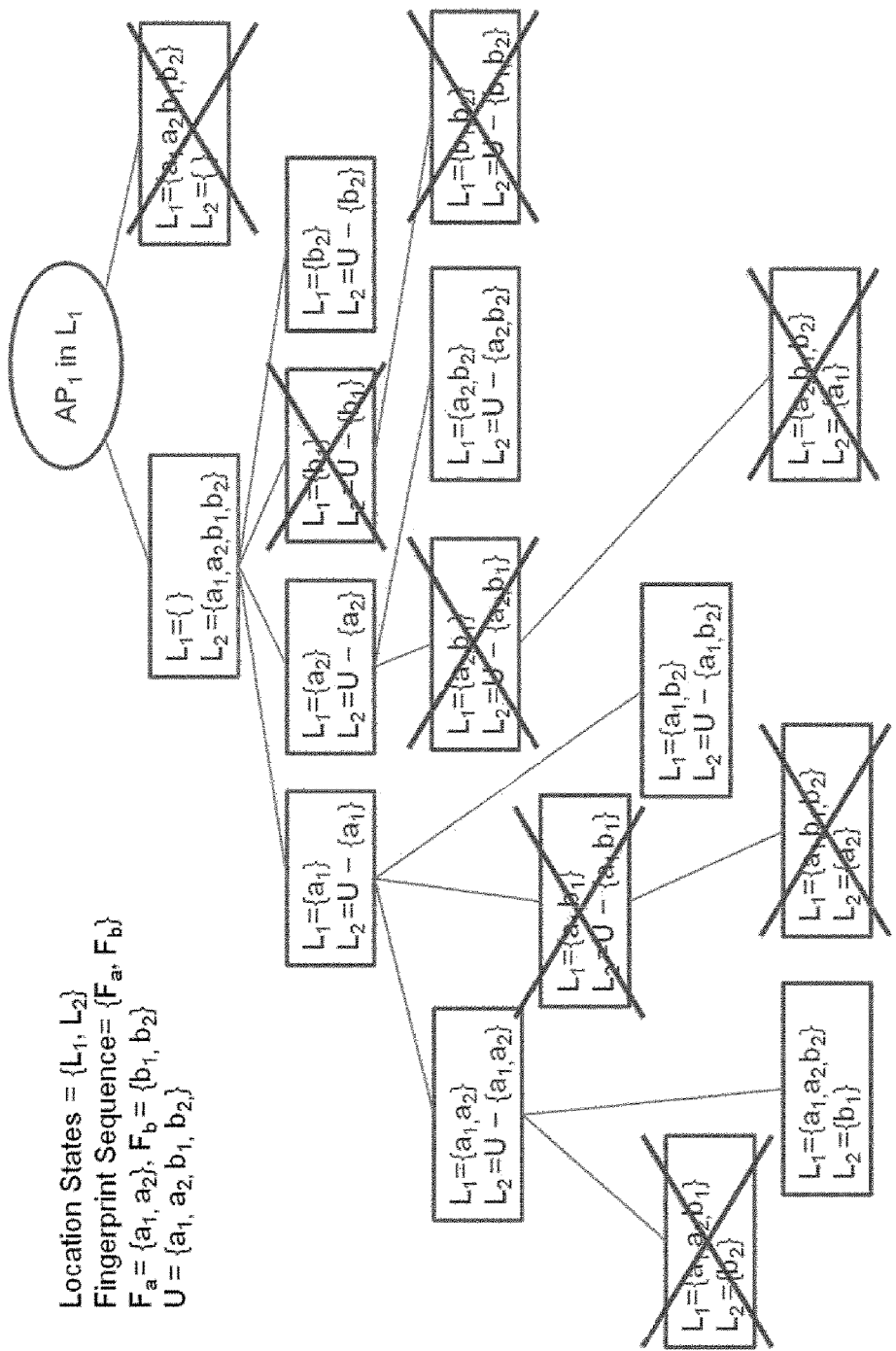
FIG. 19 is a view showing a process of reducing a search space by removing a candidate solution using reference location information.

As shown in FIG. 16, the technique suggested in the exemplary embodiments of the present disclosure can be utilized by reducing the number of APs using and treating the characteristics of the WLAN signal, and thus drastically reducing the original search space. A basic strategy for reducing the search space to embody the above-described concept is illustrated in FIG. 17.

The strategy for reducing d, that is, the number of different signal strengths, to reduce the search space, utilizes the characteristic that the WLAN signal follows a Log Distance Path Loss (LDPL) model, and performs search with respect to only a signal entering a range of Line of Sight (LOS) and None Line of Sight (NLOS) by utilizing the characteristic that a signal value exists in the range of LOS and NLOS. Specifically, with respect to the initial value determined in the global search (expressed by a base point in FIG. 17), only the strength of a neighboring signal of the corresponding base point is searched in the local search, so that d can be drastically reduced. FIG. 18 illustrates an LDPL model which is utilized to determine LOS and NLOS values and a relationship of a genotype configured based on the LDPL model. The genotype configuration is the same as described above.

In order to reduce another factor of the search space $d^{nk}$, n, the number of target APs should be drastically reduced.

3.8 Expanding Search Technique

Up to now, the technique for labeling the collection locations of the WLAN fingerprints when reference location information indicating the collection locations of the collected WLAN fingerprints is not provided has been described. However, some of the collected WLAN fingerprints may be provided with collection locations. This is because the WLAN signals may be obtained along with GPS signals or may be obtained along with signals generated from a Blutooth tag the installation location of which is known. In addition, when the installation location of an AP is known, the installation location of the WLAN repeater may be utilized as the reference location of the collected WLAN fingerprints. In addition, regarding some of the fingerprints, the collection location may be predicted using information which is obtained from an inertial sensor and collected along with the fingerprints.

In this case, the method for labeling the WLAN fingerprints using the learning model suggested in the exemplary embodiments of the present disclosure is still effective. In addition, when the collection locations of some of the WLAN fingerprints are known, the WLAN fingerprints may be labeled in the following method.

When the collected location information of the WLAN fingerprints is relatively clear, the collection locations of the WLAN fingerprints are determined in advance in the local search process, and the other WLAN fingerprints are arranged without changing the locations thereof. Therefore, the learning process can be terminated more rapidly.

In addition, when the reference location is exact, the fingerprints can be labeled more exactly. When the collection location of fingerprint $b_1$ is identified as location state $L_2$ based on the reference location information in the above-described example, 8 candidate solutions, which are provided on the assumption that the collection location of $b_1$ is $L_1$, can be excluded from the search space, so that the search space can be drastically reduced.

When the location information of the WLAN fingerprints is provided, but is not exact (GPS signal information may frequently include an error), the collection locations of the fingerprints may not be determined in advance and the probability value of the WLAN fingerprints which is observed or calculated in the corresponding location state may increase and may be reflected on the learning model suggested in the exemplary embodiments of the present disclosure.

4. Variations

Up to now, the technique for labeling the collection locations of the WLAN fingerprints when reference location information indicating the collection locations of the collected WLAN fingerprints is not provided has been described.

The Hidden Markov Model (HMM) may be used as one implementation method for realizing the FSA-based WLAN fingerprint labeling learning model. The HMM is based on FSA and may be an extended learning model of the FSA.

When the HMM is used, the location state is a hidden state and the WLAN fingerprint, which is an output value in each location state, is an observed value. In addition, a probability that a specific WLAN fingerprint is observed in each location state corresponds to an emission probability.

When the learning model is configured based on the HMM, it is necessary to select a global search algorithm or a local search algorithm to arrange WLAN fingerprint sequences suitable for the HMM model in the location states.

According to an exemplary embodiment, the genetic algorithm may be selected as the global search algorithm and the segmental K means algorithm may be selected as the local search algorithm, and the learning model may be configured by the selected algorithms. In this case, an evolved descendant may be generated by applying variation such as cross over or mutation based on a resulting value (phenotype) found in the local search, and a model initial value (genotype or chromesome) to be used in a subsequent local search may be determined based on the descendant.

The other algorithms may be selected in the global search or local search, in addition to the genetic algorithm or the segmental K means algorithm (called Viterbi Training) without departing from the scope of the present disclosure.

The technique suggested in the exemplary embodiments of the present disclosure is not applied only to the indoor space. When WLAN signals are obtained without collection location information through a plurality of unspecific smartphones in an outdoor environment where much WLAN signals exist, collection locations can be tagged and a radio map of the corresponding space can be constructed using the technique suggested in the exemplary embodiments of the present disclosure.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An automated Wireless Local Area Network (WLAN) radio map construction method, comprising:
    generating a learning model based on Finite State Automata (FSA) in which divided areas of an indoor map are expressed by location states; and
    learning to arrange collected WLAN fingerprints in corresponding location states through machine learning based on the learning model,
    wherein the learning comprises:
    setting representative WLAN fingerprints for the location states; and
    arranging the collected WLAN fingerprints in the corresponding location states with reference to the representative WLAN fingerprints, and
    wherein the setting comprises:
    finding Access Points (APs) from the collected WLAN fingerprints,
    randomly arranging the found APs in the location states, and
    assigning the representative WLAN fingerprints to the location states with reference to an arraignment of the APs and a WLAN signal propagation model,
    wherein a number of APs included in an initial value of the learning model is variable,
    wherein the number of APs included in the initial value is dynamically determined by increasing the number of APs until a condition in which a location range determined by trilateration is not distributed and is determined to be a single range less than or equal to a predetermined size is satisfied, and
    wherein an order of the APs included in the initial value is determined with reference to Information Gain (IG).

2. The automated WLAN radio map construction method of claim 1, further comprising collecting WLAN fingerprints obtained by a mobile device in an indoor space,
    wherein the learning comprises arranging the collected WLAN fingerprints in corresponding location states.

3. The automated WLAN radio map construction method of claim 2, wherein the WLAN fingerprints obtained by the mobile device do not comprise location information and movement information.

4. The automated WLAN radio map construction method of claim 1, further comprising storing a result of the arranging.

5. The automated WLAN radio map construction method of claim 1, wherein the setting and the arranging are repeated a predetermined number of times.

6. The automated WLAN radio map construction method of claim 1, wherein the setting comprises changing the representative WLAN fingerprints for the location states based on the result of the arranging.

7. The automated WLAN radio map construction method of claim 6, wherein the setting comprises changing the representative WLAN fingerprints for the location states with reference to all of the WLAN fingerprints arranged.

8. The automated WLAN radio map construction method of claim 1, wherein the setting is performed through learning using at least one of an A* algorithm, a hill climbing algorithm, a genetic algorithm, and a memetic algorithm.

9. The automated WLAN radio map construction method of claim 1, wherein the arranging is performed through learning using at least one of an Expectation Maximization (EM) algorithm and a segmental K means algorithm.

10. The automated WLAN radio map construction method of claim 1, wherein some of the WLAN fingerprints is provided with location information, and
    wherein the arranging comprises, with respect to the WLAN fingerprints provided with the location information, determining a location state for arranging with reference to the location information.

11. The automated WLAN radio map construction method of claim 10, wherein the location information is provided through at least one of GPS information, information of a tag of which installation location is known, and movement information.

12. The automated WLAN radio map construction method of claim 1, wherein the learning model is a model where the WLAN fingerprints are arranged in the FSA, and which has transition probabilities between the location states and probabilities that the WLAN fingerprints are observed as parameters.

13. An automated Wireless Local Area Network (WLAN) radio map construction system, comprising:

a collection server comprising a memory and a processor configured to collect WLAN fingerprints; and a learning server comprising a memory and a processor configured to generate a learning model based on Finite State Automata (FSA) in which divided areas of an indoor map are expressed by location states, and arrange the WLAN fingerprints collected by the collection server in corresponding location states through machine learning based on the learning model, wherein the processor of the learning server is further configured to set representative WLAN fingerprints for the location states and arrange the collected WLAN fingerprints in the corresponding location states with reference to the representative WLAN fingerprints, and wherein the processor of the learning server is further configured to:

find Access Points (APs) from the collected WLAN fingerprints, randomly arrange the APs in the location states, and assign the representative WLAN fingerprints to the location states with reference to an arraignment of the APs and a WLAN signal propagation model, wherein a number of APs included in an initial value of the learning model is variable, wherein the number of APs included in the initial value is dynamically determined by increasing the number of APs until a condition in which a location range determined by trilateration is not distributed and is determined to be a single range less than or equal to a predetermined size is satisfied, and wherein an order of the APs included in the initial value is determined with reference to Information Gain (IG).

14. The automated WLAN radio map construction system of claim 13, wherein the processor of the collection server is configured to collect WLAN fingerprints obtained by a mobile device in an indoor space.

15. The automated WLAN radio map construction system of claim 14, wherein the WLAN fingerprints obtained by the mobile device do not comprise location information and movement information.

16. The automated WLAN radio map construction system of claim 13, wherein the processor of the learning server is configured to change the representative WLAN fingerprints for the location states based on a result of the arranging.

17. The automated WLAN radio map construction system of claim 13, wherein the processor of the learning server is configured to change the representative WLAN fingerprints for the location states with reference to all of the WLAN fingerprints arranged.

* * * * *